June 24, 1958  P. T. ANDERSON ET AL  2,840,664
AMBIENT-COMPENSATED THERMAL OVERLOAD RELAYS
Filed June 19, 1957
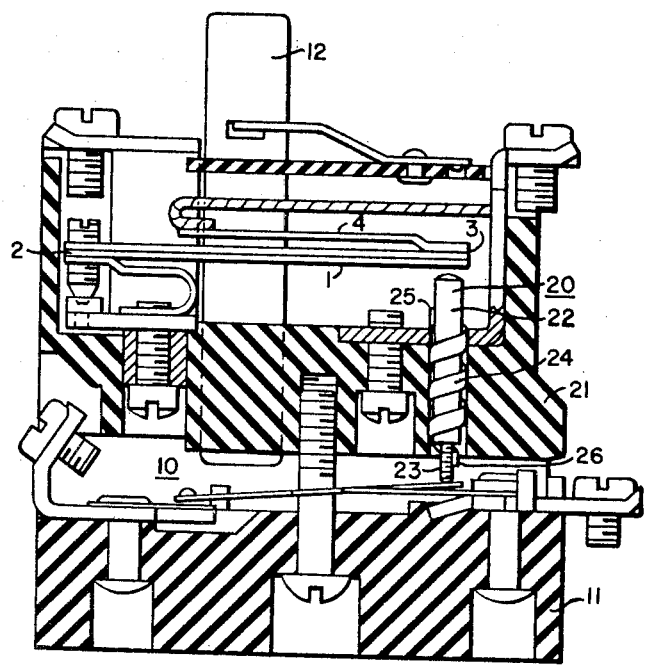
WITNESSES
INVENTORS
Paul T. Anderson
& James B. Ramsey
BY
ATTORNEY

United States Patent Office 2,840,664
Patented June 24, 1958

2,840,664

AMBIENT-COMPENSATED THERMAL OVERLOAD RELAYS

Paul T. Anderson and James B. Ramsey, Chippewa Township, Beaver County, Pa., assignors to Westinghouse Electric Corporation, East Pittsburgh, Pa., a corporation of Pennsylvania Application June 19, 1957, Serial No. 666,583

6 Claims. (Cl. 200—113)

Our invention relates to small simple ambient-compensated thermal overload relays, and like devices, in which a small volumetric size is a prime requisite. Heretofore, small-volume thermal overload relays have been successfully evolved, without compensation for the ambient temperature, for the protection of compressor-driving motors and other load-units which are subject to overloading. The smallest sizes of these relays have been achieved in a construction in which the bimetallic force or pushing-movement is transmitted to a snap-action switch through an actuator-pin which moves in the direction of its length. Our present invention substitutes, for a simple actuator-pin, in such a combination, a thermally responsive pin which reduces its over-all length in response to a rise in the ambient temperature, thus compensating for the portion of the bimetal movement which is dependent upon the ambient temperature.

An illustrative form of embodiment of our invention is shown in the accompanying drawing, the single figure of which is an enlarged cross-sectional view of an ambient-compensated relay embodying our invention.

The illustrated relay embodies a current-responsive bimetal or bimetallic strip 1, which is provided with a suitable mounting-means 2 for causing said current-responsive bimetal to have a movable portion 3 which is capable of exerting a bimetallic or thermally responsive force or pushing-movement, which increases with the operative temperature of the bimetal. Means are provided whereby this current-responsive bimetal may be heated in response to an electric current, either by causing the bimetal to be traversed by the current, as shown, or to be heated by an adjacent current-traversed resistor-strip 4, or by both expedients, as shown.

Our illustrated relay also includes a separate snap-action switch 10, and a mounting-means 11 whereby said switch is held in a spaced relation with respect to the movable portion 3 of the current-responsive bimetal 1. Our snap-action switch 10 is shown as being provided with a suitable resetting-means 12, which may be either manually operated, or automatic in its operation. While it is desirable, for obvious reasons, that the switch 10 should be of a snap-action type, as shown, it is possible that a simpler form of switch might be used in some cases.

And finally, the illustrated relay is provided with an actuator-pin 20, and mounting-means 21 whereby said actuator-pin is movable in the direction of its length in a position adapted to transmit the bimetallic force from the movable portion 3 of the current-responsive bimetal 1 to the switch 10, in order to actuate said switch.

In accordance with our present invention, the actuator-pin 20 is a pin which has a thermal response, which causes its over-all length to contract in response to a rise in the ambient temperature to which this pin is subjected. The thermally responsive contraction of this pin 20 is made to substantially counteract or neutralize that portion of the movement of the current-heated bimetal 1 which is due to the ambient temperature, thus compensating for variations in the ambient temperature. The actuator-pin 20 is mounted in a position in which it is kept at a temperature which is approximately that of the ambient temperature surrounding the relay-unit, and so that very little of the current-responsive heating of the bimetal 1 is transmitted to this actuator-pin 20. In our present invention, which uses ambient-compensation, where it is desirable to keep as much as possible of the current-responsive heating from being transmitted to the actuator-pin 20, it is advantageous, although perhaps not obligatory, that the current-responsive bimetal 1 should be directly heated, by being traversed by the current, and that the indirect heating should be minimized by using a low-resistance strip 4, so as to reduce the amount of current-responsive heating-energy which is introduced into the relay-unit as a whole.

In the broadest concept of my invention, it is possible that any kind of thermal response might be used, for the actuator-pin 20, whereby the pin reduces its length in response to a rise in the ambient temperature. This contraction or reduction in the length of the actuator-pin 20 must be in an amount which is equal and opposite to that portion of the pushing-movement of the current-responsive bimetal 1 which is due to the same rise in ambient temperature to which the pin 20 responds. There are certain practical limits as to the total amount of movement of the current-responsive bimetal 1 which may be used in any practical relay, with reasonable manufacturing dimensional tolerances, and hence it is usually extremely desirable that a special construction of thermally responsive actuator-pin 20 be provided, whereby the contraction in the pin-length may be of sufficient magnitude for practical purposes.

In accordance with our invention, therefore, we prefer to build the actuator-pin 20 so that it has an exaggerated amount of length-reducing response to any rise in the ambient temperature. Our preferred, illustrated pin-construction comprises a pin-member proper 22, which has a screwed extension 23 at an end thereof, and which has a spirally disposed ambient-responsive compensating bimetal 24 which surrounds said pin-member 22. One end 15 of the spiral bimetal 24 is secured to the pin-member proper 22, while the other end 26 is secured to the screwed extension 23; or other suitable securing-means are provided, which enables the compensating bimetal 24 to cause a rotation of the screwed extension 23 with respect to the pin-member 22, in response to changes in the ambient temperature of the overload relay. By this means, the over-all length of the actuator-pin 20 is changed in an amount and direction suitable for substantially compensating for that portion of the movement of the current-responsive bimetal 1 which is responsive to the ambient temperature.

It is to be emphasized that the paramount or most important aspect of our ambient-compensated thermal relay is extreme compactness in size, and in particular, its adaptation to the pin-type actuator-construction which has resulted in the smallest size of non-compensated thermal relay which has heretofore been evolved. We are aware that various other means for achieving ambient compensation have heretofore been associated with current-heated bimetallic elements, where such extreme reduction in the space-requirements were not achieved. We believe that our thermally responsive shrinkage in the length of an actuator-pin, in response to the ambient temperature, is new in ambient-compensated bimetal overload relays.

While we have shown and described our invention in connection with an overload relay for which our invention was primarily designed, it is quite possible, also, that our ambient-compensated actuator-pin 20 may also be useful in transmitting the thermal expansions of elements, other than a current-responsive bimetal, which are subjected to various operative temperatures, different from the ambient temperature, for acting upon any other force-actuated movable member, not necessarily an electric switch. This statement is made, without detracting from the fact that we believe our invention to be particularly adapted for, and useful in, the operation of an electric switch, and particularly in the operation of a snap-action switch, in which a very sensitive and accurate switching-action is obtained in response to a very definite and accurately controlled position of the actuator, or operating-pin or mechanism, of the switch.

In the accompanying drawing, we have illustrated a particular type of thermal overload relay which, except for its ambient compensation, is similar to the overload relay covered by our application Serial No. 499,629, filed April 6, 1955. While our invention is particularly adapted for this kind of switch, we consider that the useful applications of our invention are not limited to the precise structural details of this particular overload relay, other than the use of an ambient-compensated actuator-pin.

We claim as our invention:

1. An ambient-compensated thermally responsive device, comprising a thermally expansible member which is subjected to various operative temperatures which are different from the ambient temperature, mounting-means for causing said thermally expansible member to have a movable portion which is capable of exerting a thermally responsive pushing-movement which increases with said operative temperatures, a force-actuated movable member, mounting-means whereby said force-actuated member is disposed at substantially said ambient temperature in a spaced relation with respect to said movable portion of said thermally expansible member, an actuator-pin, and mounting-means whereby said actuator-pin is movable in the direction of its length in a position adapted to transmit said thermally responsive pushing-movement to said force-actuated member, said actuator-pin having a thermal response which causes its over-all length to contract in response to a rise in the ambient temperature.

2. An ambient-compensated thermally responsive device, comprising a thermally expansible member which is operative at various temperatures different from the ambient temperature, mounting-means for causing said thermally expansible member to have a movable portion which is capable of exerting a thermally responsive force with respect to said mounting-means, a force-actuated movable member, mounting-means whereby said force-actuated member is disposed at substantially said ambient temperature in a spaced relation with respect to said movable portion of said thermally expansible member, an actuator-pin, and mounting-means whereby said actuator-pin is movable in the direction of its length in a position adapted to transmit said thermally responsive force to said force-actuated member, said actuator-pin comprising a pin-member having a screwed extension at an end thereof, a spirally disposed ambient-responsive compensating bimetal which surrounds said pin-member, and securing-means which enables said compensating bimetal to cause a rotation of said screwed extension with respect to said pin-member in response to changes in said ambient temperature.

3. An ambient-compensated current-responsive device, comprising a current-responsive bimetal, mounting-means for causing said current-responsive bimetal to have a movable portion which is capable of exerting a bimetallic force, means whereby said current-responsive bimetal may be heated in response to an electric current, a force-actuated movable member, mounting-means whereby said force-actuated member is disposed in a spaced relation with respect to said movable portion of the current-responsive bimetal, an actuator-pin, and mounting-means whereby said actuator-pin is movable in the direction of its length in a position adapted to transmit said bimetallic force to said force-actuated member, said actuator-pin comprising a pin-member having a screwed extension at an end thereof, a spirally disposed ambient-responsive compensating bimetal which surrounds said pin-member, and securing-means which enables said compensating bimetal to cause a rotation of said screwed extension with respect to said pin-member in response to changes in the ambient temperature of the device.

4. An ambient-compensated thermal overload relay, comprising a current-responsive bimetal, mounting-means for causing said current-responsive bimetal to have a movable portion which is capable of exerting a bimetallic pushing-movement which increases with the temperature of said current-responsive bimetal, means whereby said current-responsive bimetal may be heated in response to an electric current, a switch, mounting-means whereby said switch is held in a spaced relation with respect to said movable portion of the current-responsive bimetal, an actuator-pin, and mounting-means whereby said actuator-pin is movable in the direction of its length in a position adapted to transmit said bimetallic force to said switch to actuate said switch, said actuator-pin having a thermal response which causes its over-all length to contract in response to a rise in the ambient temperature.

5. An ambient-compensated thermal overload relay, comprising a current-responsive bimetal, mounting-means for causing said current-responsive bimetal to have a movable portion which is capable of exerting a bimetallic force, means whereby said current-responsive bimetal may be heated in response to an electric current, a switch, mounting-means whereby said switch is held in a spaced relation with respect to said movable portion of the current-responsive bimetal, an actuator-pin, and mounting-means whereby said actuator-pin is movable in the direction of its length in a position adapted to transmit said bimetallic force to said switch to actuate said switch, said actuator-pin comprising a pin-member having a screwed extension at an end thereof, a spirally disposed ambient-responsive compensating bimetal which surrounds said pin-member, and securing-means which enables said compensating bimetal to cause a rotation of said screwed extension with respect to said pin-member in response to changes in the ambient temperature of the overload relay.

6. An ambient-compensated thermal overload relay, comprising a current-responsive bimetal, mounting-means for causing said current-responsive bimetal to have a movable portion which is capable of exerting a bimetallic force, means whereby said current-responsive bimetal may be traversed by an electric current, a separate snap-action switch, mounting-means whereby said switch is held in a spaced relation with respect to said movable portion of the current-responsive bimetal, an actuator-pin, mounting-means whereby said actuator-pin is movable in the direction of its length in a position adapted to transmit said bimetallic force to said switch to actuate said switch, and resetting means for said switch, said actuator-pin comprising a pin-member having a screwed extension at an end thereof, a spirally disposed ambient-responsive compensating bimetal which surrounds said pin-member, and securing-means which enables said compensating bimetal to cause a rotation of said screwed extension with respect to said pin-member in response to changes in the ambient temperature of the overload relay.

References Cited in the file of this patent

UNITED STATES PATENTS

| | | |
|---|---|---|
| 2,014,607 | Angeli | Sept. 17, 1935 |
| 2,300,901 | Armstrong | Nov. 3, 1942 |
| 2,578,949 | Schell | Dec. 18, 1951 |